(12) United States Patent
Chen et al.

(10) Patent No.: US 7,271,642 B2
(45) Date of Patent: Sep. 18, 2007

(54) CHARGE PUMP DRIVE CIRCUIT FOR A LIGHT EMITTING DIODE

(75) Inventors: Tien-Tzu Chen, Hsinchu (TW); Chia-Hung Tsen, Hsinchu County (TW)

(73) Assignee: Aimtron Technology Corp., Hsinchu (TW)

( * ) Notice: Subject to any disclaimer, the term of this patent is extended or adjusted under 35 U.S.C. 154(b) by 37 days.

(21) Appl. No.: 11/306,408

(22) Filed: Dec. 27, 2005

(65) Prior Publication Data
US 2007/0146050 A1    Jun. 28, 2007

(51) Int. Cl.
*H01L 31/00* (2006.01)
(52) U.S. Cl. .................. 327/514; 327/536; 315/291
(58) Field of Classification Search ............... 327/514, 327/536; 315/291
See application file for complete search history.

(56) References Cited

U.S. PATENT DOCUMENTS

| | | | |
|---|---|---|---|
| 6,091,614 A * | 7/2000 | Malenfant ................... 363/97 |
| 6,107,862 A | 8/2000 | Mukainakano et al. |
| 6,400,211 B1 | 6/2002 | Yokomizo et al. |
| 6,411,531 B1 | 6/2002 | Nork et al. |
| 6,512,411 B2 | 1/2003 | Meng et al. |
| 6,538,394 B2 | 3/2003 | Volk et al. |
| 6,556,067 B2 | 4/2003 | Henry |
| 6,657,875 B1 | 12/2003 | Zeng et al. |
| 6,690,146 B2 | 2/2004 | Burgyan et al. |
| 7,116,086 B2 * | 10/2006 | Burgyan et al. ............ 323/271 |

OTHER PUBLICATIONS

"1A Low Noise High Current LED Charge Pump with Independent Torch/Flash Current Control", Linear Technology, pp. 1-12, LTC3216, 2004.

* cited by examiner

*Primary Examiner*—Kenneth B. Wells
(74) *Attorney, Agent, or Firm*—Winston Hsu (57) ABSTRACT

Through operated alternately between a charging phase and a discharging phase, a charge pump converts an input voltage source into a drive voltage for being supplied to a light emitting diode. A current setting unit determines a reference current. A current regulating unit has a current regulating terminal and a feedback detecting terminal. The current regulating terminal is coupled to the light emitting diode so as to control a current flowing through the light emitting diode to be proportional to the reference current. The feedback detecting terminal provides a feedback signal representative of a current regulation characteristic voltage. Based on a difference between the feedback signal and a reference voltage source, an error amplifier generates an error signal. A variable resistance unit is coupled between the input voltage source and the charge pump for adjusting a variable resistance in response to the error signal.

17 Claims, 5 Drawing Sheets

CHARGE PUMP DRIVE CIRCUIT FOR A LIGHT EMITTING DIODE

BACKGROUND OF THE INVENTION

1. Field of the Invention

The present invention relates to a charge pump drive circuit and, more particularly, to a charge pump drive circuit for a light emitting diode.

2. Description of the Related Art

Figure 1A:
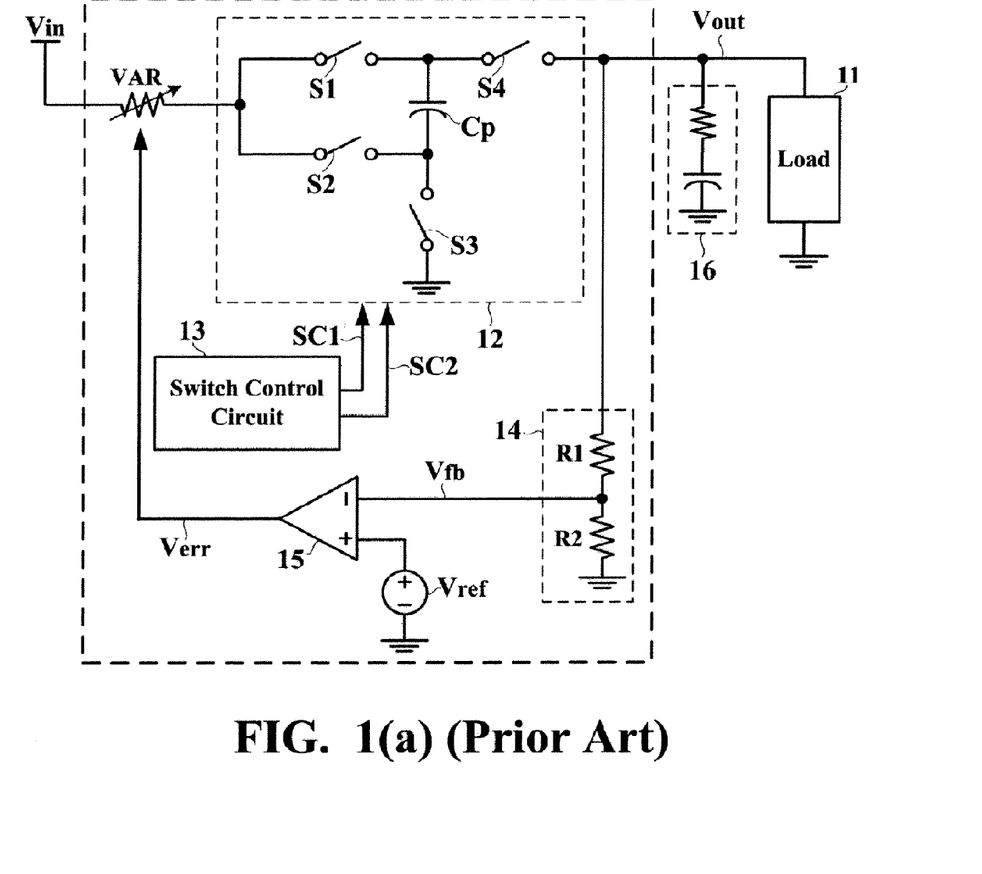
FIG. 1(a) is a detailed circuit diagram showing a conventional charge pump drive circuit.

FIG. 1(a) is a detailed circuit diagram showing a conventional charge pump drive circuit 10. The charge pump drive circuit 10 converts an input voltage source $V_{in}$ into a drive voltage $V_{out}$ for driving a load 11. Sometimes the input voltage source $V_{in}$ is not at an appropriate status to be directly applied for driving the load 11, such as in the case where the input voltage source $V_{in}$ is too high, too low, or fluctuating very much. For this reason, the charge pump drive circuit 10 is necessary for generating an applicable and stable drive voltage $V_{out}$ through regulating the input voltage source $V_{in}$. For example, the conventional charge pump drive circuit 10 is provided with a 1:2 step-up charge pump 12, which is operated alternately between a charging phase and a discharging phase in accordance with switch control signals SC1 and SC2 generated from a switch control circuit 13, thereby generating a drive voltage $V_{out}$ that is twice as large as the input voltage source $V_{in}$.

Figure 1B:
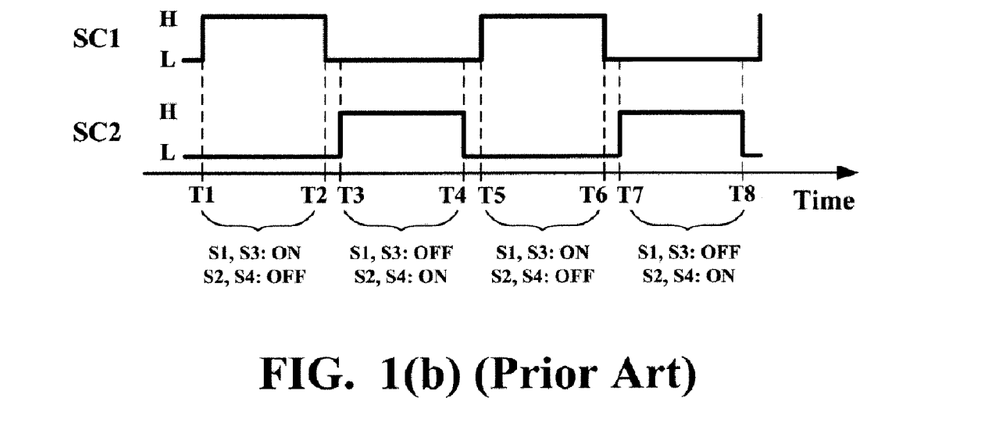
FIG. 1(b) is a waveform timing chart showing switch control signals in a conventional charge pump drive circuit.

More specifically, the 1:2 step-up charge pump 12 shown in FIG. 1(a) consists of a first switch S1, a second switch S2, a third switch S3, a fourth switch S4, and a pumping capacitor Cp. The first switch S1 is coupled between the input voltage source $V_{in}$ and a first electrode of the pumping capacitor Cp; the second switch S2 is coupled between the input voltage source $V_{in}$ and a second electrode of the pumping capacitor Cp; the third switch S3 is coupled between the second electrode of the pumping capacitor Cp and a ground potential; and the fourth switch S4 is coupled between the first electrode of the pumping capacitor Cp and the drive voltage $V_{out}$. As shown in FIG. 1(b), the first and second switch control signals SC1 and SC2 generated from the switch control circuit 13 are non-overlapping with respect to each other, each of which is a binary oscillating signal having a high level H and a low level L. The first switch control signal SC1 is applied to the first and third switches S1 and S3 while the second switch control signal SC2 is applied to the second and fourth switches S2 and S4. During the charging phase, such as from time T1 to time T2 and from time T5 to T6, the first and third switches S1 and S3 are turned ON while the second and fourth switches S2 and S4 are turned OFF, causing the first electrode of the pumping capacitor Cp to be connected to the input voltage source $V_{in}$ and the second electrode of the pumping capacitor Cp to be connected to the ground potential. During the discharging phase, such as from time T3 to time T4 and from time T7 to time T8, the second and fourth switches S2 and S4 are turned ON while the first and third switches S1 and S3 are turned OFF, causing the first electrode of the pumping capacitor Cp to be connected to the drive voltage $V_{out}$ and the second electrode of the pumping capacitor Cp to be connected to the input voltage source $V_{in}$. Through the alternate operations between the charging and discharging phases, the pumping capacitor Cp is able to provide the drive voltage $V_{out}$ that is twice as large as the input voltage source $V_{in}$.

In order to maintain the drive voltage $V_{out}$ at the desired regulation value, the conventional charge pump drive circuit 10 is further provided with a feedback control system including a voltage detection circuit 14, an error amplifier 15, a reference voltage source $V_{ref}$, and a variable resistance unit VAR. The voltage detection circuit 14 is directly coupled to the output terminal of the 1:2 step-up charge pump 12 for generating a feedback signal $V_{fb}$ representative of the drive voltage $V_{out}$. As shown in FIG. 1(a), the voltage detection circuit 14 may be implemented by a resistive voltage divider in which the coupling point between the series-connected resistors R1 and R2 is used for providing a partial voltage of $[R2/(R1+R2)]*V_{out}$ as the feedback signal $V_{fb}$. Based on a difference between the feedback signal $V_{fb}$ and the reference voltage source $V_{ref}$, the error amplifier 15 generates an error signal $V_{err}$ for controlling the variable resistance unit VAR. Since the variable resistance unit VAR provides a variable resistance between the input voltage source $V_{in}$ and the pumping capacitor Cp, the charging current into the pumping capacitor Cp during the charging phase may be adjusted and the discharging current out of the pumping capacitor Cp during the discharging phase may be adjusted, thereby effectively regulating the drive voltage $V_{out}$ provided by the pumping capacitor Cp. As a result, when reaching at the stable state the feedback signal $V_{fb}$ is regulated to become substantially equal to the reference voltage source $V_{ref}$, and at the same time the drive voltage $V_{out}$ is correspondingly regulated as expected. Finally through a typical filter 16 for removing some possible ripples, a desired drive voltage $V_{out}$ is applied to the load 11.

Although the conventional charge pump drive circuit 10 shown in FIG. 1(a) is able to provide a stable, regulated drive voltage $V_{out}$ to the load 11, the conventional charge pump drive circuit 10 finds itself incompetent to control the brightness of a light emitting diode that is used as the load 11 because the brightness of the light emitting diode is determined by the drive current rather than the drive voltage. Moreover, in order to ensure that the light emitting diode is actually turned on in any case, the conventional charge pump drive circuit 10 is typically designed to supply a higher-than-necessary drive voltage $V_{out}$ at the cost of reducing the driving efficiency.

SUMMARY OF THE INVENTION

An object of the present invention is to provide a charge pump drive circuit for driving a light emitting diode such that the brightness of the light emitting diode is regulated and an optimum driving efficiency is achieved.

According to one aspect of the present invention, a charge pump drive circuit is provided for driving a light emitting diode, including: a charge pump, a switch control circuit, a current regulation circuit, an error amplifier, and a variable resistance unit. The charge pump converts an input voltage source into a drive voltage to be supplied to the light emitting diode. The switch control circuit operates the charge pump alternately between a charging phase and a discharging phase. The current regulation circuit has a current setting unit and a current regulating unit. The current setting unit is used for determining a reference current. The current regulating unit has a current regulating terminal and a feedback detecting terminal. The current regulating unit is coupled to the light emitting diode so as to control a current flowing through the light emitting diode to become proportional to the reference current. The feedback detecting terminal is used for providing a feedback signal representative of a current regulation characteristic voltage. The error amplifier generates an error signal based on a difference between the feedback signal and a reference voltage source. The variable resistance unit is coupled between the input voltage source and the charge pump for adjusting a variable resistance in response to the error signal.

According to another aspect of the present invention, a charge pump drive method is disclosed for providing a predetermined drive current to a light emitting diode having a first electrode and a second electrode. An input voltage source is converted into a drive voltage by employing a charge pump having at least one pumping capacitor, each of which is coupled between the input voltage source and the drive voltage through a plurality of switches. The drive voltage is supplied to the first electrode of the light emitting diode. The current regulation circuit is coupled to the second electrode of the light emitting diode so as to control a current flowing through the light emitting diode to become equal to the predetermined drive current. A current regulation characteristic voltage of the current regulation circuit is detected. Based on a difference between the current regulation characteristic voltage and a reference voltage source, a variable resistance connected in series between the input voltage source and the at least one pumping capacitor is adjusted.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION OF THE PREFERRED EMBODIMENTS

The preferred embodiments according to the present invention will be described in detail with reference to the drawings.

Figure 2:
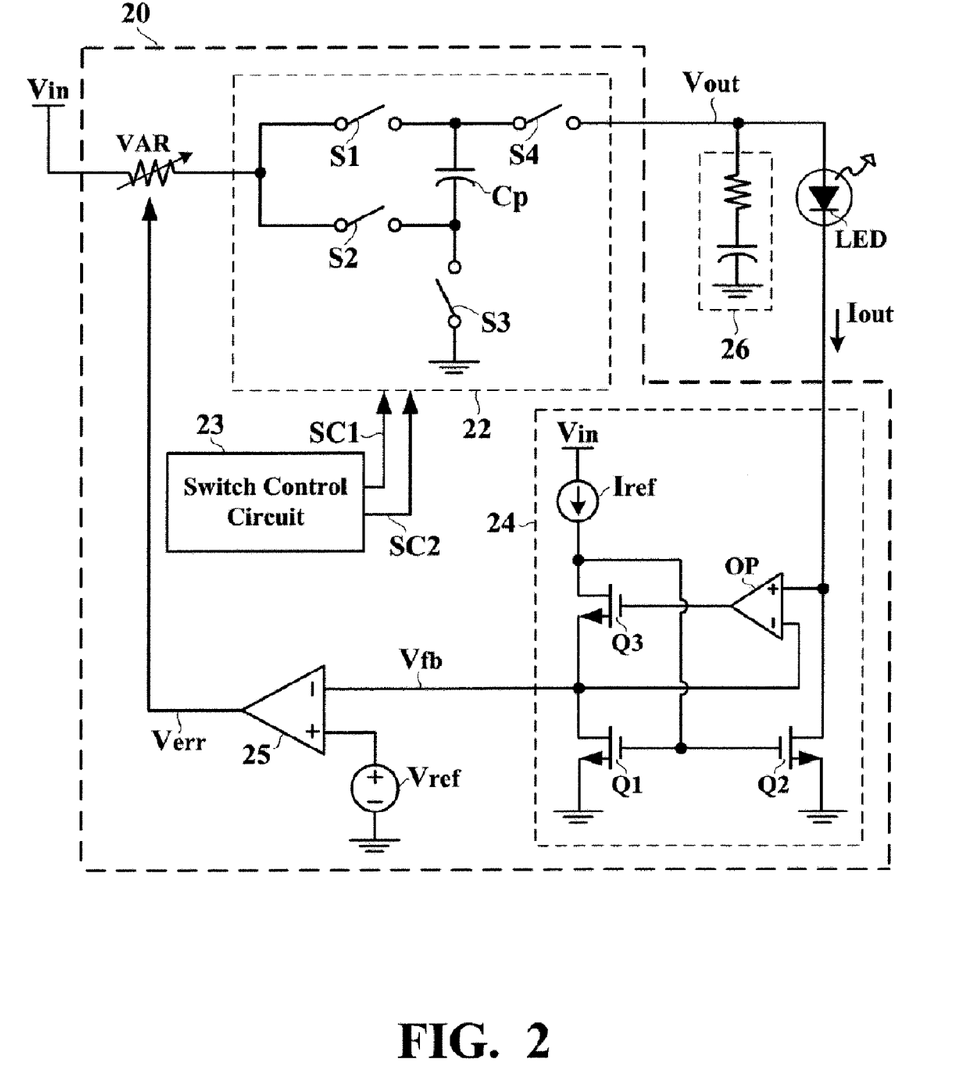
FIG. 2 is a detailed circuit diagram showing a charge pump drive circuit for a light emitting diode according to a first embodiment of the present invention.

FIG. 2 shows a charge pump drive circuit 20 according to a first embodiment of the present invention, for converting an input voltage source $V_{in}$ into a drive voltage $V_{out}$ and providing a regulated drive current $I_{out}$, for driving a light emitting diode LED. The charge pump drive circuit 20 of the first embodiment primarily includes a charge pump 22, a switch control circuit 23, a current regulation circuit 24, an error amplifier 25, and a variable resistance unit VAR.

The charge pump 22 shown in FIG. 2 is implemented by a 1:2 step-up charge pump whose configuration and operation are substantially identical to the 1:2 step-up charge pump shown in FIG. 1(a), so any further detailed description is omitted here. In accordance with switch control signals SC1 and SC2 generated from a switch control circuit 23, the charge pump 22 may generate a drive voltage $V_{out}$ that is twice as large as the input voltage source $V_{in}$. The switch control signals SC1 and SC2 generated from the switch control circuit 23 are substantially identical to those shown in FIG. 1(b), so any further detailed description is omitted here.

The current regulation circuit 24 controls the drive current $I_{out}$ flowing through the light emitting diode LED to become equal to a predetermined regulation value, such that the brightness of the light emitting diode LED is regulated and kept stable. More specifically, the current regulation circuit 24 has a current setting unit and a current regulating unit. The current setting unit determines a reference current $I_{ref}$. The current regulating unit has a current regulating terminal, coupled to the light emitting diode LED, for controlling the drive current $I_{out}$ flowing through the light emitting diode LED to become equal or proportional to the reference current $I_{ref}$. The current regulating unit further has a feedback detecting terminal for providing a feedback signal $V_{fb}$ representative of a current regulation characteristic voltage of the current regulation circuit 24.

In the embodiment shown in FIG. 2, the current setting unit is constructed by a reference current source $I_{ref}$ and a transistor Q1 while the current regulating unit is constructed by transistors Q2 and Q3 and an operational amplifier OP. The transistors Q1 and Q2 form a current mirror structure: the gate electrode of the transistor Q1 is coupled to the gate electrode of the transistor Q2; the source electrode of the transistor Q1 and the source electrode of the transistor Q2 are both coupled to the ground potential; and the gate and drain electrodes of the transistor Q1 are coupled together. Therefore, when the reference current source $I_{ref}$ is applied to the transistor Q1, the drive current $I_{out}$ flowing into the drain electrode of the transistor Q2 is K times larger than the reference current source $I_{ref}$ if the size (i.e. the width-to-length ratio of the current channel) of the transistor Q2 is designed to be K times larger than that of the Q1. In this case, the drain electrode of the transistor Q2 may serve as the current regulating terminal so as to be coupled to the cathode (n-type electrode) of the light emitting diode such that a certain amount of brightness is radiated out of the light emitting diode LED though the regulated drive current $I_{out}$. In order to establish a proportional relationship between the drive current $I_{out}$ and the reference current source $I_{ref}$ as precisely as expected in the current mirror structure, the drain electrode of the transistor Q1 should be preferably kept as closer to the drain electrode of the transistor Q2 as possible in terms of the voltage potential. For this reason, the current regulating unit provides a voltage follower formed by the operational amplifier OP and the transistor Q3. More specifically, the operational amplifier OP has an inverting input terminal (−) coupled to the drain electrode of the transistor Q1 and a non-inverting input terminal (+) coupled to the drain electrode of the transistor Q2. The transistor Q3 has a source electrode coupled to the drain electrode of the transistor Q2 and a drain electrode coupled to the reference current source $I_{ref}$. Through using an output terminal of the operational amplifier OP to control the gate electrode of the transistor Q3, the drain electrode of the transistor Q1 and the drain electrode of the transistor Q2 may be substantially kept at the same voltage potential.

The charge pump drive circuit 20 according to the first embodiment of the present invention executes a constant current method for driving the light emitting diode LED so as to effectively control the brightness of the light emitting diode LED. However, the conventional charge pump drive circuit 10 shown in FIG. 1(a) executes a constant voltage method, as described in detail earlier, and then fails to control the brightness of the light emitting diode LED. With respect to the constant current driving method according to the present invention, in order to empower the current regulation circuit 24 to perform the function of regulating current, a high enough operational voltage should be maintained at the drain electrodes of the transistors Q1 and Q2 so as to ensure that the transistors Q1 and Q2 are operated in the saturation region. Therefore, in the charge pump drive circuit 20 according to the first embodiment of the present invention, the feedback detecting terminal may be implemented by the inverting input terminal (−) of the operational amplifier OP. As described earlier, the inverting input terminal (−) of the operational amplifier OP is coupled to the drain electrode of the transistor Q1 and causes the voltage thereof to follow the non-inverting input terminal (+) of the operational amplifier OP, i.e. the voltage at the drain electrode of the transistor Q2. As a result, the feedback signal $V_{fb}$ provided from the feedback detecting terminal is a representative of the voltage at the drain electrodes of the transistors Q1 and Q2. Based on a difference between feedback signal $V_{fb}$ and the reference voltage source $V_{ref}$, the error amplifier 25 generates an error signal $V_{err}$ for controlling the variable resistance unit VAR. Since the variable resistance unit VAR provides a variable resistance in series between the input voltage source $V_{in}$ and the pumping capacitor Cp, the charging current into the pumping capacitor Cp during the charging phase may be adjusted and the discharging current out of the pumping capacitor Cp during the discharging phase may be adjusted, thereby effectively regulating the drive voltage $V_{out}$ provided by the pumping capacitor Cp. Finally through a typical filter 26 for removing some possible ripples, the drive voltage $V_{out}$ is supplied to the anode (p-type electrode) of the light emitting diode LED. Because the variation of the drive voltage $V_{out}$ induces the variation of the voltage at the drain electrodes of the transistors Q1 and Q2 when the light emitting diode LED is turned ON, the feedback signal $V_{fb}$ is effectively regulated to become equal to the reference voltage source $V_{ref}$ through the error signal $V_{err}$ and the variable resistance unit VAR. Therefore, under the condition that the reference voltage source $V_{ref}$ is set high enough for allowing the transistors Q1 and Q2 to operate in the saturation region, the current regulation circuit 24 is sufficiently empowered to regulate the drive current $I_{out}$ under the drive voltage $V_{out}$.

It should be noted that in regard to the origin of the feedback signal $V_{fb}$, the charge pump drive circuit 20 according to the first embodiment of the present invention is obviously different from the conventional charge pump drive circuit 10 shown in FIG. 1(a) because the conventional charge pump drive circuit 10 directly detects the drive voltage $V_{out}$ or its division to generate the feedback signal $V_{fb}$ with the only purpose of sustaining the drive voltage $V_{out}$ at a predetermined regulation value. However, the charge pump drive circuit 20 according to the first embodiment of present invention generates the feedback signal $V_{fb}$ through detecting the current regulation characteristic voltage, i.e. the voltage at the drain electrodes of the transistors Q1 and Q2 so as to make sure that the current regulating function is executed. Moreover, the drive voltage $V_{out}$ output from the charge pump drive circuit 20 according to the first embodiment of the present invention is allowed to be set as low as possible if the current regulation circuit 24 remains sufficiently empowered to perform the current regulating function. For this reason, the charge pump drive circuit 20 according to the first embodiment of the present invention achieves a better driving efficiency than the conventional charge pump drive circuit 10.

The variable resistance unit VAR may be implemented by an equivalent conductive resistance $R_{ds(on)}$ of a current channel between drain and source electrodes in a metal-oxide-semiconductor (MOS) transistor. More specifically, the current channel between drain and source electrodes of the MOS transistor is coupled in series between the input voltage source $V_{in}$ and the charge pump 22 and at the same time the gate electrode of the MOS transistor is controlled by the error signal $V_{err}$. Through adjusting the equivalent conductive resistance $R_{ds(on)}$ of the current channel between drain and source electrodes in the MOS transistor by the error signal $V_{err}$, the current flowing between the input voltage source $V_{in}$ and the charge pump 22 is effectively controlled whether during the charging or discharging phases.

Figure 3:
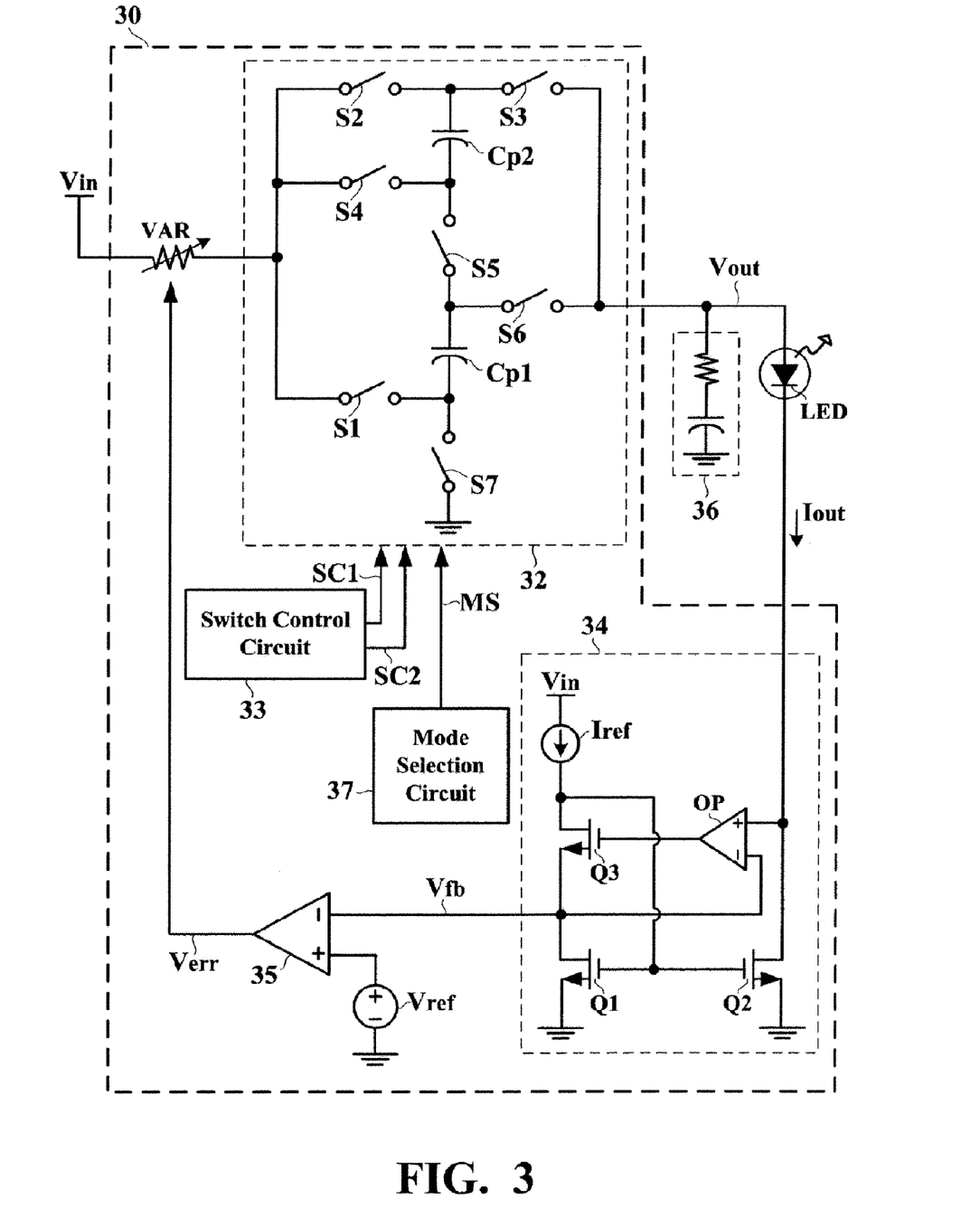
FIG. 3 is a detailed circuit diagram showing a charge pump drive circuit for a light emitting diode according to a second embodiment of the present invention.

FIG. 3 is a detailed circuit diagram showing a charge pump drive circuit 30 for a light emitting diode according to a second embodiment of the present invention. The second embodiment is different from the first embodiment in that the charge pump drive circuit 30 of the second embodiment employs a multi-mode charge pump 32. More specifically, the multi-mode charge pump 32 consists of seven switches S1 to S7 and two pumping capacitors Cp1 and Cp2, all coupled together to form the circuit configuration as shown in FIG. 3. Through appropriately controlling the ON and OFF operations of the switches S1 to S7, the multi-mode charge pump 32 may be operated in a 1:1, 1:1.5, or 1:2 modes. In the 1:1 mode, the switches S1 and S7 are turned OFF while the switches S2 to S6 are turned ON, thereby generating a drive voltage $V_{out}$ that is equal to the input voltage source $V_{in}$.

In the 1:1.5 mode, the multi-mode charge pump 32 is operated alternately between a charging phase and a discharging phase in accordance with switch control signals SC1 and SC2 generated from a switch control circuit 33 so as to generate a drive voltage $V_{out}$ that is equal to 1.5 times as large as the input voltage source $V_{in}$. During the charging phase, the switches S1, S3, S4, and S6 are turned OFF while the switches S2, S5, and S7 are turned ON. During the discharging phase, the switches S2, S5, and S7 are turned OFF while the switches S1, S3, S4, and S6 are turned ON.

In the 1:2 mode, the multi-mode charge pump 32 is operated alternately between a charging phase and a discharging phase in accordance with switch control signals SC1 and SC2 generated from a switch control circuit 33 so as to generate a drive voltage $V_{out}$ that is equal to 2 times as large as the input voltage source $V_{in}$. During the charging phase, the switches S1, S2, S3, and S6 are turned OFF while the switches S4, S5, and S7 are turned ON. During the discharging phase, the switches S2, S3, S4, S5, and S7 are turned OFF while the switches S1 and S6 are turned ON.

In order to select an operational mode at which the multi-mode charge pump 32 is about to be operated, the charge pump drive circuit 30 according to the second embodiment of the present invention is provided with a mode selection circuit 37 for applying a mode selection signal MS to the multi-mode charge pump 32. Through detecting any one of the input voltage source $V_{in}$, the drive voltage $V_{out}$, and the feedback signal $V_{fb}$ or even their various combinations, the mode selection circuit 37 determines in which one of the 1:1, 1:1.5, and 1:2 modes the multi-mode charge pump 32 should be operated at this moment. Since the input voltage source $V_{in}$ usually decreases gradually along with time when in use, such as in the case where the input voltage source $V_{in}$ is implemented by a portable battery or the like, the multi-mode charge pump 32 should be set in a mode having a relatively small multiplicative ratio when the input voltage source $V_{in}$ has a relatively high level at the beginning of the battery's life, but the multi-mode charge pump 32 should be changed to a mode having a relatively large multiplicative ratio when the input voltage source $V_{in}$ decreases to a relatively low level later in use.

As an alternative way, it is through detecting the drive voltage $V_{out}$ that the mode selection circuit 37 determines at which mode the multi-mode charge pump 32 should be set to operate. More specifically, once the multi-mode charge pump 32 is operated in a mode having a relatively small multiplicative ratio but fails to provide a high enough drive voltage $V_{out}$, the multi-mode charge pump 32 is determined ready to be changed into a mode having a relatively large multiplicative ratio. To the contrary, once the multi-mode charge pump 32 is operated in a mode having a relatively large multiplicative ratio and provides a higher-than-necessary drive voltage $V_{out}$, the multi-mode charge pump 32 is determined ready to be changed into a mode having a relatively small multiplicative ratio so as to avoid unnecessary power consumption and then enhance the driving efficiency.

As a still alternative way, it is on the basis of the feedback signal $V_{fb}$ that the mode selection circuit 37 determines at which mode the multi-mode charge pump 32 should be set to operate. More specifically, when the multi-mode charge pump 32 is operating in a mode having a relatively small multiplicative ratio, if it is observed that the current regulation circuit 34 fails to provide the necessary drive current $I_{out}$ because the feedback signal $V_{fb}$ is lower than the reference voltage source $V_{ref}$, the multi-mode charge pump 32 is determined ready to be changed into a mode having a relatively large multiplicative ratio. To the contrary, when the multi-mode charge pump 32 is operating in a mode having a relatively large multiplicative ratio, if it is observed that the feedback signal $V_{fb}$ is much higher than the reference voltage source $V_{ref}$, the multi-mode charge pump 32 is determined ready to be changed into a mode having a relatively small multiplicative ratio so as to avoid unnecessary power consumption and then enhance the driving efficiency.

It is should be noted that the multi-mode charge pump 32 according to the present invention is not limited to the circuit configuration and multiplicative ratios mentioned with regard to FIG. 3, but may be implemented by other charge pump structures executing the charging/discharging techniques of the pumping capacitors and various multiplicative ratios, so as to convert the input voltage source $V_{in}$ into the drive voltage $V_{out}$.

Figure 4:
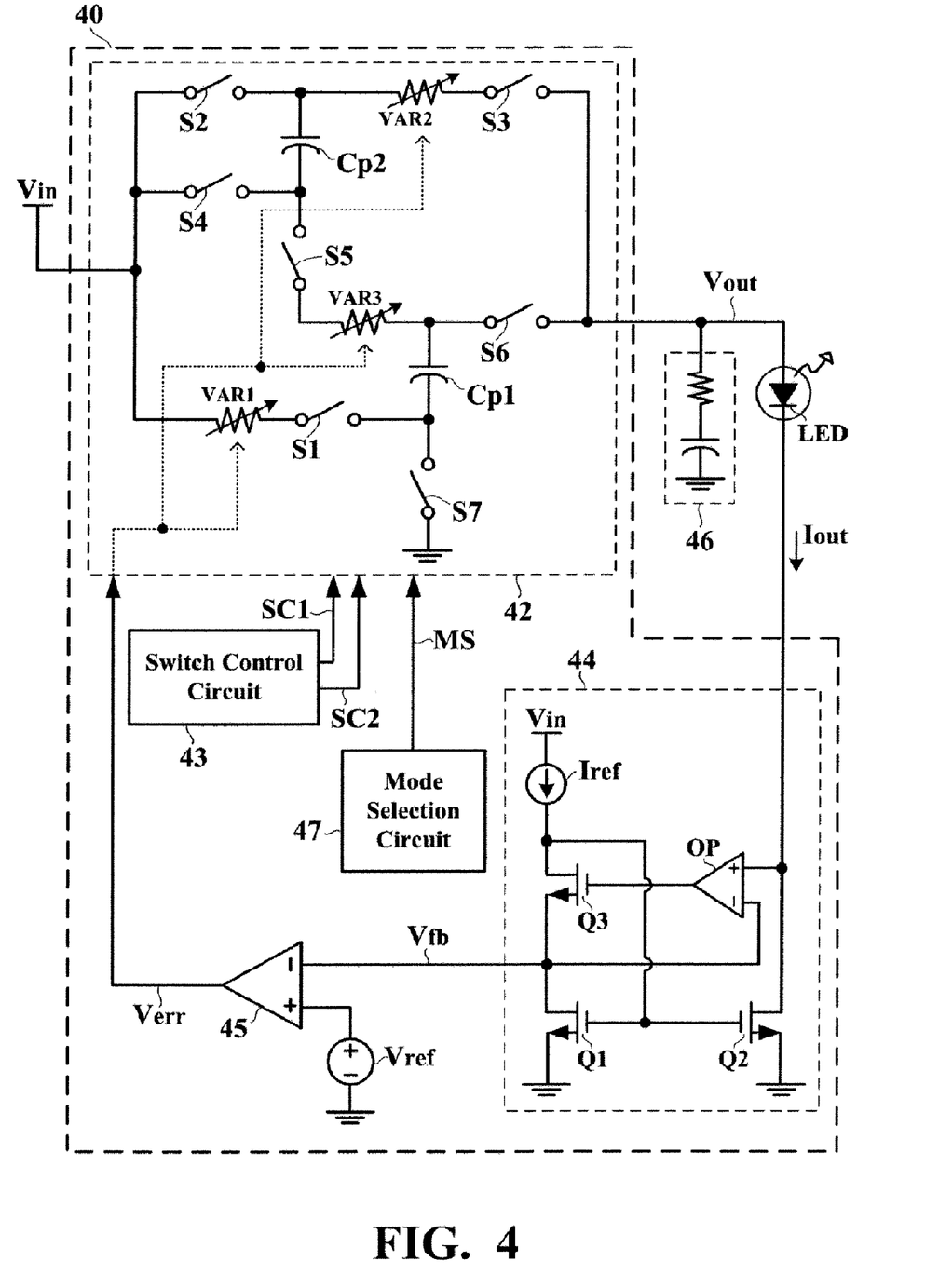
FIG. 4 is a detailed circuit diagram showing a charge pump drive circuit for a light emitting diode according to a third embodiment of the present invention.

FIG. 4 is a detailed circuit diagram showing a charge pump drive circuit 40 for a light emitting diode according to a third embodiment of the present invention. The third embodiment is different from the second embodiment in that the third embodiment simultaneously employs three variable resistance units VAR1, VAR2, and VAR3, which are separate with respect to one another, to replace the single variable resistance unit VAR of the second embodiment. More specifically, the first variable resistance unit VAR1 is connected in series to the switch S1, the second variable resistance unit VAR2 is connected in series to the switch S3, and the third variable resistance unit VAR3 is connected in series to the switch S5. Like the single variable resistance unit VAR in the second embodiment, each of the variable resistance units VAR1, VAR2, and VAR3 in the third embodiment are simultaneously controlled by an error signal $V_{err}$ generated from an error amplifier 45. When the switch S1 is turned ON, the first variable resistance unit VAR1 may adjust the current flowing into/out of the first pumping capacitor Cp1 through the switch S1. When the switch S3 is turned ON, the second variable resistance unit VAR2 may adjust the current flowing into/out of the second pumping capacitor Cp2 through the switch S3. When the switch S5 is turned ON, the third variable resistance unit VAR3 may adjust the current flowing into/out of the first pumping capacitor Cp1 or the second pumping capacitor Cp2 through the switch S5.

Figure 5:
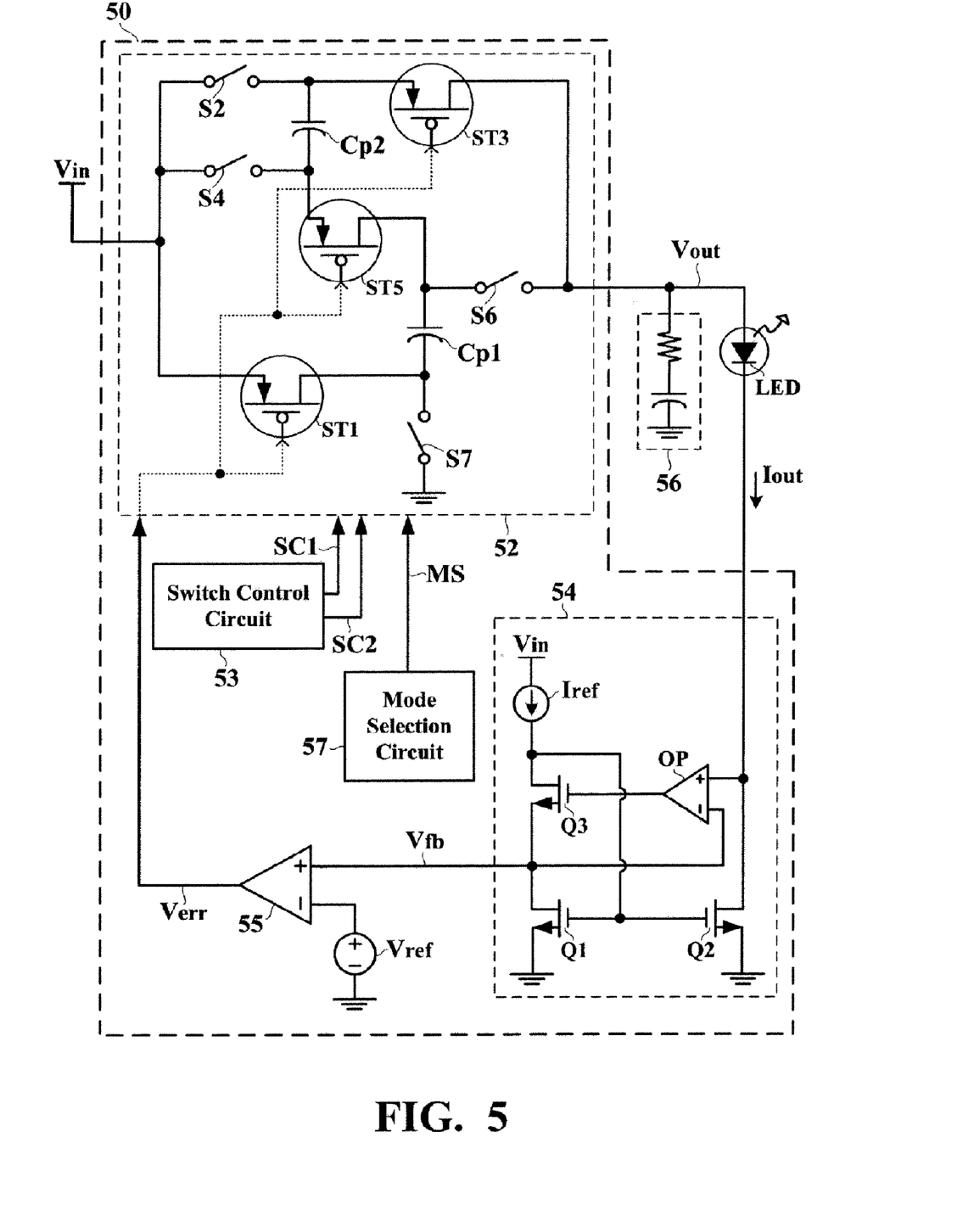
FIG. 5 is a detailed circuit diagram showing a charge pump drive circuit for a light emitting diode according to a fourth embodiment of the present invention.

FIG. 5 is a detailed circuit diagram showing a charge pump drive circuit 50 for a light emitting diode according to a fourth embodiment of the present invention. The fourth embodiment is different from the third embodiment in that the fourth embodiment employs three P-type MOS transistors ST1, ST2, and ST5 to correspondingly replace the switch S1 and the variable resistance unit VAR1, the switch S3 and the variable resistance unit VAR2, and the switch S5 and the variable resistance unit VAR3. As well-known by one skilled in the art, the MOS transistor not only has the simple features of being turned ON and OFF, but also adjusts the equivalent conductive resistance $R_{ds(on)}$ of the current channel between drain and source electrodes in response to the voltage control signal at the gate electrode when the MOS transistor is turned ON. Therefore, the MOS transistor is capable of executing the circuit functions originating from the switch as well as from the variable resistance unit. The P-type MOS transistors ST1, ST3, and ST5 are turned ON/OFF in response to switch control signals SC1 and SC2 generated from a switch control circuit 53, and for each of them the equivalent conductive resistance $R_{ds(on)}$ of the current channel between drain and source electrodes thereof is adjusted in response to an error signal $V_{err}$ generated from an error amplifier 55.

More specifically, the P-type MOS transistor ST1 has a source electrode coupled to the input voltage source $V_{in}$, and a drain electrode coupled to the first electrode of the first pumping capacitor Cp1 and the switch S7. When the P-type MOS transistor ST1 is turned ON, the error signal $V_{err}$ generated from the error amplifier 55 is applied to the gate electrode of the P-type MOS transistor ST1 and then adjusts the current flowing through the current channel of the P-type MOS transistor ST1. The P-type MOS transistor ST3 has a source electrode coupled to the first electrode of the second pumping capacitor Cp2 and the switch S2, and a drain electrode coupled to the switch S6 and the drive voltage $V_{out}$. When the P-type MOS transistor ST3 is turned ON, the error signal $V_{err}$ generated from the error amplifier 55 is applied to the gate electrode of the P-type MOS transistor ST3 and then adjusts the current flowing through the current channel of the P-type MOS transistor ST3. The P-type MOS transistor ST5 has a source electrode coupled to the second electrode of the second pumping capacitor Cp2 and the switch S4, and a drain electrode coupled to the second electrode of the first pumping capacitor Cp1 and the switch S6. When the P-type MOS transistor ST5 is turned ON, the error signal $V_{err}$ generated from the error amplifier 55 is applied to the gate electrode of the P-type MOS transistor ST5 and then adjusts the current flowing through the current channel of the P-type MOS transistor ST5.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A charge pump drive circuit for driving a light emitting diode, comprising:

a charge pump for converting an input voltage source into a drive voltage to be supplied to the light emitting diode;

a switch control circuit for operating the charge pump alternately between a charging phase and a discharging phase;

a current regulation circuit having a current setting unit and a current regulating unit, the current setting unit being used for determining a reference current, the current regulating unit having a current regulating terminal and a feedback detecting terminal, the current regulating unit being coupled to the light emitting diode so as to control a current flowing through the light emitting diode to become proportional to the reference current, the feedback detecting terminal being used for providing a feedback signal representative of a current regulation characteristic voltage;

an error amplifier for generating an error signal based on a difference between the feedback signal and a reference voltage source; and a variable resistance unit coupled between the input voltage source and the charge pump for adjusting a variable resistance in response to the error signal.

2. The charge pump drive circuit according to claim 1, wherein:

the charge pump has a first switch, a second switch, a third switch, a fourth switch, and a pumping capacitor, in which the first switch is coupled between the input voltage source and a first electrode of the pumping capacitor, the second switch is coupled between the input voltage source and a second electrode of the pumping capacitor, the third switch is coupled between the second electrode of the pumping capacitor and a ground potential, and the fourth switch is coupled between the first electrode of the pumping capacitor and the drive voltage.

3. The charge pump drive circuit according to claim 2, wherein:

during the charging phase, the switch control circuit turns on both of the first and the third switches but turns off both of the second and the fourth switches, and during the discharging phase, the switch control circuit turns off both of the first and the third switches but turns on both of the second and the fourth switches.

4. The charge pump drive circuit according to claim 1, wherein:

the charge pump has a first switch, a second switch, a third switch, a fourth switch, a fifth switch, a sixth switch, a seventh switch, a first pumping capacitor, and a second pumping capacitor, in which the first switch is coupled between the input voltage source and a first electrode of the first pumping capacitor, the second switch is coupled between the input voltage source and a first electrode of the second pumping capacitor, the third switch is coupled between the first electrode of the second pumping capacitor and the drive voltage, the fourth switch is coupled between the input voltage source and a second electrode of the second pumping capacitor, the fifth switch is coupled between a second electrode of the first pumping capacitor and the second electrode of the second pumping capacitor, the sixth switch is coupled between the second electrode of the first pumping capacitor and the drive voltage, and the seventh switch is coupled between the first electrode of the first pumping capacitor and a ground potential.

5. The charge pump drive circuit according to claim 4, wherein:

during the charging phase, the switch control circuit turns off the first, the third, the fourth, and the sixth switches but turns on the second, the fifth, and the seventh switches, and during the discharging phase, the switch control circuit turns on the first, the third, the fourth, and the sixth switches but turns off the second, the fifth, and the seventh switches.

6. The charge pump drive circuit according to claim 4, wherein:

during the charging phase, the switch control circuit turns off the first, the second, the third, and the sixth switches but turns on the fourth, the fifth, and the seventh switches, and during the discharging phase, the switch control circuit turns off the second, the third, the fourth, the fifth, and the seventh switches but turns on the first and the sixth switches.

7. The charge pump drive circuit according to claim 1, wherein:

the current setting unit has a reference current source and a first transistor, in which the first reference current source provides the reference current and a source electrode of the first transistor is coupled to a ground potential, and the current regulating unit has a second transistor, a third transistor, and an operational amplifier, in which a gate electrode of the second transistor is coupled to a gate electrode of the first transistor, a drain electrode of the second transistor serves as the current regulating terminal, a source electrode of the second transistor is coupled to the ground potential, a drain electrode of the third transistor is coupled to the reference current source and the gate electrode of the first transistor, a source electrode of the third transistor is coupled to a drain electrode of the first transistor, a non-inverting input terminal of the operational amplifier is coupled to the drain electrode of the second transistor, an inverting input terminal of the operational amplifier is coupled to the drain electrode of the first transistor and serves as the feedback detecting terminal, an output terminal of the operational amplifier is coupled to a gate electrode of the third transistor.

8. The charge pump drive circuit according to claim 1, wherein:

the variable resistance unit is implemented by an equivalent conductive resistance of a current channel in a transistor.

9. The charge pump drive circuit according to claim 8, wherein:

the current channel of the transistor is coupled between the input voltage source and the charge pump, and a gate electrode of the transistor is controlled by the error signal.

10. A charge pump drive circuit for driving a light emitting diode, comprising:

a charge pump for converting an input voltage source into a drive voltage for being supplied to the light emitting diode, the charge pump having a first switch, a second switch, a third switch, a fourth switch, a fifth switch, a sixth switch, a seventh switch, a first pumping capacitor, and a second pumping capacitor, in which the first switch is coupled between the input voltage source and a first electrode of the first pumping capacitor, the second switch is coupled between the input voltage source and a first electrode of the second pumping capacitor, the third switch is coupled between the first electrode of the second pumping capacitor and the drive voltage, the fourth switch is coupled between the input voltage source and a second electrode of the second pumping capacitor, the fifth switch is coupled between a second electrode of the first pumping capacitor and the second electrode of the second pumping capacitor, the sixth switch is coupled between the second electrode of the first pumping capacitor and the drive voltage, and the seventh switch is coupled between the first electrode of the first pumping capacitor and a ground potential;

a switch control circuit for operating the charge pump alternately between a charging phase and a discharging phase;

a current regulation circuit having a current setting unit and a current regulating unit, the current setting unit being used for determining a reference current, the current regulating unit having a current regulating terminal and a feedback detecting terminal, the current regulating unit being coupled to the light emitting diode so as to control a current flowing through the light emitting diode to become proportional to the reference current, the feedback detecting terminal being used for providing a feedback signal representative of a current regulation characteristic voltage;

an error amplifier for generating an error signal based on a difference between the feedback signal and a reference voltage source;

a first variable resistance unit coupled in series to the first switch for adjusting a first variable resistance in response to the error signal;

a second variable resistance unit coupled in series to the third switch for adjusting a second variable resistance in response to the error signal; and a third variable resistance unit coupled in series to the fifth switch for adjusting a third variable resistance in response to the error signal.

11. The charge pump drive circuit according to claim 10, wherein:

the first switch is implemented by a first transistor such that the first transistor provides a current channel to serve as the first variable resistance unit;

the third switch is implemented by a second transistor such that the second transistor provides a current channel to serve as the second variable resistance unit; and the fifth switch is implemented by a third transistor such that the third transistor provides a current channel to serve as the third variable resistance unit.

12. The charge pump drive circuit according to claim 11, wherein:

the error signal is applied to a gate electrode of the first transistor, thereby adjusting an equivalent conductive resistance of the current channel in the first transistor;

the error signal is applied to a gate electrode of the second transistor, thereby adjusting an equivalent conductive resistance of the current channel in the second transistor; and the error signal is applied to a gate electrode of the third transistor, thereby adjusting an equivalent conductive resistance of the current channel in the third transistor.

13. The charge pump drive circuit according to claim 10, wherein:

during the charging phase, the switch control circuit turns off the first, the third, the fourth, and the sixth switches but turns on the second, the fifth, and the seventh switches, and during the discharging phase, the switch control circuit turns on the first, the third, the fourth, and the sixth switches but turns off the second, the fifth, and the seventh switches.

14. The charge pump drive circuit according to claim 10, wherein:

during the charging phase, the switch control circuit turns off the first, the second, the third, and the sixth switches but turns on the fourth, the fifth, and the seventh switches, and during the discharging phase, the switch control circuit turns off the second, the third, the fourth, the fifth, and the seventh switches but turns on the first and the sixth switches.

15. The charge pump drive circuit according to claim 10, wherein:

the current setting unit has a reference current source and a first transistor, in which the first reference current source provides the reference current and a source electrode of the first transistor is coupled to a ground potential, and the current regulating unit has a second transistor, a third transistor, and an operational amplifier, in which a gate electrode of the second transistor is coupled to a gate electrode of the first transistor, a drain electrode of the second transistor serves as the current regulating terminal, a source electrode of the second transistor is coupled to the ground potential, a drain electrode of the third transistor is coupled to the reference current source and the gate electrode of the first transistor, a source electrode of the third transistor is coupled to a drain electrode of the first transistor, a non-inverting input terminal of the operational amplifier is coupled to the drain electrode of the second transistor, an inverting input terminal of the operational amplifier is coupled to the drain electrode of the first transistor and serves as the feedback detecting terminal, an output terminal of the operational amplifier is coupled to a gate electrode of the third transistor.

16. A charge pump drive method for driving a light emitting diode having a first electrode and a second electrode, the method comprising:

converting an input voltage source into a drive voltage by employing a charge pump having at least one pumping capacitor, each of which is coupled between the input voltage source and the drive voltage through a plurality of switches;

supplying the drive voltage to the first electrode of the light emitting diode;

coupling a current regulation circuit to the second electrode of the light emitting diode so as to control a current flowing through the light emitting diode to become equal to a predetermined drive current;

detecting a current regulation characteristic voltage of the current regulation circuit; and adjusting a variable resistance connected in series between the input voltage source and the at least one pumping capacitor based on a difference between the current regulation characteristic voltage and a reference voltage source, wherein the current regulation circuit has a current setting unit and a current regulating unit, the current setting unit being used for determining the predetermined drive current, the current regulating unit having a current regulating terminal and a feedback detecting terminal, the current regulating unit being coupled to the second electrode of the light emitting diode, the feedback detecting terminal being used for providing the current regulation characteristic voltage.

17. The charge pump drive method according to claim 16, wherein:

the current regulation characteristic voltage is a representative of a voltage at the current regulating terminal.

* * * * *